United States Patent [19]

Anderson et al.

[11] Patent Number: 5,247,388

[45] Date of Patent: Sep. 21, 1993

[54] CONTINUOUSLY VARIABLE DELAY LINES

[75] Inventors: Christopher S. Anderson; Michael C. Zari; Robert J. Berinato, all of Huntsville, Ala.

[73] Assignee: Dynetics, Inc., Huntsville, Ala.

[21] Appl. No.: 889,498

[22] Filed: May 27, 1992

[51] Int. Cl.$^5$ .......................... G02F 1/11; G02F 1/33; G02B 27/46

[52] U.S. Cl. .................................. 359/287; 359/285; 359/305; 359/306; 359/308; 359/314; 359/560; 385/7; 385/10

[58] Field of Search ............... 359/205, 209, 285, 287, 359/306, 308, 560, 305, 314, 198; 385/7, 10

[56] References Cited

U.S. PATENT DOCUMENTS

| | | | |
|---|---|---|---|
| 3,466,112 | 9/1969 | Emshwiller | 359/306 |
| 4,097,110 | 6/1978 | Carey | 359/287 |
| 4,390,247 | 6/1983 | Freyre | 350/358 |
| 4,541,694 | 9/1985 | Sullivan et al. | 359/305 |
| 4,655,593 | 4/1987 | Storck et al. | 359/305 |
| 5,187,487 | 2/1993 | Riza | 359/285 |

FOREIGN PATENT DOCUMENTS 3711606 10/1987 Fed. Rep. of Germany ...... 359/305

OTHER PUBLICATIONS

"An acousto-optic modulator for a $CO_2$ laser rangefinder using heterodyne detection"; Optical and Quantum Electronics 12; No. 5 Sep. 1980 p. 419.

Anthony Vanderlugt, "Accousto-Optic Devices", *Optical Signal Processing* pp. 289-297, 1992 (distributed at least as early as 1988).

M. J. Brienza, "Variable Time Compression, Expansion, and Reversal of RF Signals by Laser-Acoustic Techniques", *Applied Physics Letters*, vol. 12, No. 5, pp. 181-184 (Mar. 1968).

M. J. Brienza and A. J. DeMaria, "Continuously-Variable Ultrasonic-Optical Delay Line", *Applied Physics Letters*, vol. 9, No. 8, pp. 312-314 (Oct. 1966).

Primary Examiner—Bruce Y. Arnold
Assistant Examiner—Evelyn A. Lester
Attorney, Agent, or Firm—Needle & Rosenberg

[57] ABSTRACT

An acousto-optic apparatus is described that varies the time delay of electrical signals over a continuum of delays. In the preferred embodiment, a light source, which can be either coherent or incoherent, emits an optical beam that is focused into an acousto-optic cell. An input electrical signal is used to drive the acousto-optic cell which, in turn, modulates the focused optical beam. Portions of the input optical beam are modulated and diffracted at angles proportional to the frequencies and phases contained in the input electrical signal. By appropriately choosing the cone of angles at which the light is focused into the acousto-optic cell, the diffracted optical beam can be made to overlap with portions of the undiffracted, unmodulated optical beam. All of the light exiting the acousto-optic cell is then collected onto a device for detection. Optical photomixing of the diffracted beam and the undiffracted beam is performed in order to derive the input electrical signal with a time delay. The approach to generating a continuously variable delay maintains a true time delay of the input electrical signal on its electrical carrier frequency, and does not suffer the limitations imposed by only time delaying the modulation envelope of the input electrical signal. Since all optical beams travel exactly the same physical path, the present invention is robust to mechanical or thermal variations unlike inferior acousto-optic approaches for implementing time delay.

20 Claims, 2 Drawing Sheets

CONTINUOUSLY VARIABLE DELAY LINES

FIELD OF THE INVENTION

Our invention relates generally to the field of signal time delay and specifically to an acousto-optic system for continuously varying the time delay of signals.

DESCRIPTION OF PRIOR ART

Continuously variable delay lines that use bulk wave acousto-optic cells are known in the prior art. For example, U.S. Pat. No. 4,390,247 describes an optical heterodyning technique for delaying an input electrical signal. In that patent, a light beam, which must be coherent, is modulated by an acousto-optic cell after which a second reference beam is added to the modulated beam. These two light beams are Fourier transformed and a means is provided for detecting the optical heterodyning of the two beams. The output of the detection means is a replica of the input signal with a prescribed time delay.

In an acousto-optic delay line of the type described in U.S. Pat. No. 4,390,247, wherein a beam deflector translates both the input to the acousto-optic cell and the second reference beam, a delay of the modulation envelope is effected, but the carrier frequency of the output signal remains unchanged. For this prior art, a single-frequency electrical input signal generates an optical beam that is parallel to the reference beam. After detection, a single-frequency signal is output that is stationary with respect to the phase of the single frequency input, regardless of the position of the input beam into the acousto-optic cell, and therefore the signal is not time-delayed. There is also a practical utility limitation of said device since the device is overly sensitive to mechanical vibrations and thermal variations. This sensitivity arises because the modulated beam and the reference beam travel physically separated paths. When the apparatus is subject to vibrations or thermal changes, the modulated beam and reference beam experience small changes in their relative travel distance. Due to optical heterodyning, the small path differences result in large, random phase changes of the output signal. This instability is unacceptable in most delay line applications.

Using an acousto-optic cell as a modulator in an optical system is not a new concept. For example, Korpel, *Acousto-Optics*, Marcel Dekker, New York, 1988, and VanderLugt, *Optical Signal Processing*, Wiley & Sons, 1992, address the design and operation of acousto-optic modulators. In neither text is the application of these devices to the field of delay lines proposed. Also, in neither case is the undiffracted beam utilized to generate the desired output signal, which is a fundamental feature of our invention.

SUMMARY OF THE INVENTION

It is an object of this invention to produce an improved continuously variable delay line that is more robust to both thermal variations and mechanical vibrations.

It is another object of this invention to provide a signal delay line that generates a true time delay.

It is a further object of this invention to provide an improved signal delay device that utilizes fewer components and hence is more stable and less expensive to manufacture.

It is also an object of this invention to provide a signal delay line that can employ either a coherent or an incoherent light source.

It is yet a further object of this invention to provide a signal delay device that does not require a reference beam.

In accordance with the present invention, an acousto-optic system is described that is capable of performing the continuously variable time delay of electric signals. In the present invention, a light source, which can be either coherent or incoherent, emits a beam of light which is focused into the acousto-optic cell. No means are necessary for providing a reference optical beam. The acousto-optic cell is driven by an electric signal that serves to modulate the optical beam. Portions of this input optical beam will be diffracted at angles that are proportional to the frequencies contained in the input electric signal.

By appropriately choosing the cone of angles at which the light is focused into the acousto-optic cell, portions of the diffracted input optical beam that have been modulated by the input electrical signal will overlap and be collinear with other portions of the input optical beam which have not been diffracted. All of the light exiting the acousto-optic cell is then collected onto a means for detection.

The optical detector performs optical photomixing of the undiffracted and diffracted beam. Since both optical beams travel exactly the same physical path, no relative path difference will occur as a result of mechanical or thermal variations. This unique self-modulating feature of the present invention allows a very stable time delay apparatus to be constructed. Another benefit of making both beams traverse the exact same path is that either an incoherent or a coherent optical light source can be employed. Also, fewer components are required, which simplifies fabrication and tolerancing, and lowers manufacturing cost.

For a better understanding of the present invention, together with other and further objects, reference is made to the following description, taken in conjunction with the accompanying drawings.

DETAILED DESCRIPTION OF THE PREFERRED EMBODIMENT

Figure 1:
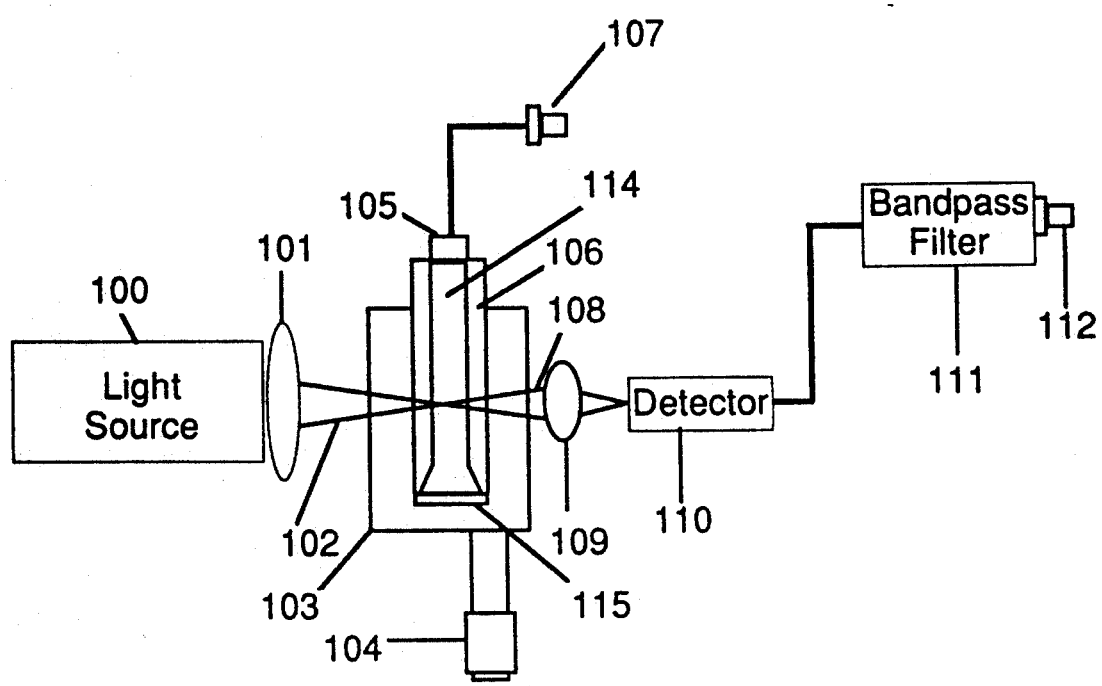
FIG. 1 is a diagrammatic illustration of the preferred embodiment of the improved continuously variable delay line employing the principles of our invention.

FIG. 1 illustrates the preferred embodiment of the invention wherein an acousto-optic cell 106 is employed to effect a continuously variable time delay of an electrical input signal. A light source 100, which can be coherent or incoherent, is focused into the acousto-optic cell 106 by means of lens 101. The acousto-optic cell 106 comprises a transducer 105 for converting the input electrical signal into an acoustic signal, a transparent acoustic crystal 114, and an acoustic absorber 115 to attenuate the acoustic wave after it traverses the cell length. The input electrical signal to be delayed is applied from terminal 107 (for simplicity, two ground returns are not illustrated in the Figures) to the transducer 105 which, in turn, produces an acoustic wave in the acousto-optic cell 106. This acoustic wave, in turn, modulates portions of the focused light beam 102 entering the acousto-optic cell at the Bragg angle. The modulated portions of the focused light beam 102 are diffracted at angles proportional to the band width of the signal and the wavelength spread of the light source 100.

The cone of angles defined by the focused incident beam 102 is critical to the design of the present improved delay line. Acousto-optic diffraction occurs when light is input at the Bragg angle, which is given by $$\theta_B = \frac{f_s \lambda}{2 V_a} \quad (1)$$

where $f_s$ is the temporal frequency of an input electric signal, $V_a$ is the acoustic velocity of the acousto-optic cell 106, and $\lambda$ is the optical wavelength of the light source 100. Of course, if multiple frequencies are present in the electric signal or if a spread of optical wavelengths are in the light source, the Bragg angle will be a range of angles. Only light entering the acousto-optic cell 106 at angles close to $\theta_B$ will create a diffracted beam. Light at any other angle will simply pass straight through the cell without creating a diffracted beam.

Figure 2:
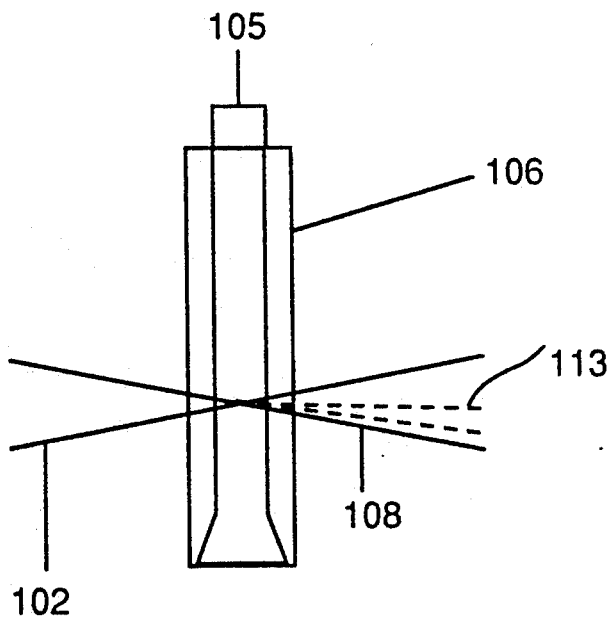
FIG. 2 illustrates the overlapping diffracted and undiffracted beams as employed by the present invention illustrated in FIG. 1.

As illustrated in FIG. 2, it is essential to the present invention that some portion of the focused input light beam 102 be Bragg matched to cause diffraction and that the diffracted beam 113 will overlap and be collinear with a portion of the undiffracted output beam 108. By focusing the input optical beam 102 into the cell 106 at a cone having an angle at least 2 $\theta_B$, both of these requirements will be satisfied. Thus, by focusing light into the acousto-optic cell 106 with a sufficient cone of angles, an undiffracted beam and some diffracted light will exit the cell 106 from the focal point of the cone at the same angle.

A collecting element 109, such as a lens or a concave mirror, collects the light exiting the acousto-optic cell 106 onto the optical detection device 110. Element 109 need not be a Fourier transforming element. To recreate the electrical signal input at terminal 107, with the appropriate time delay, the signal that has been modulated onto the diffracted optical beam must be detected. The diffracted optical beam is frequency shifted by the frequencies in the input electrical signal. To recover the input signal, the optical detector 110 should be a device that has a square-law response, such as a photomixing detector. The combined diffracted and non-diffracted beam is necessary for the time delayed signal to be detected by the square-law detector. It is important that the two optical beams be not only overlapping but travelling at the same angle as well because, if not, the heterodyning efficiency will be decreased, causing a substantial reduction in the output amplitude of the time delayed signal.

One component of the electrical signal leaving the optical detection device 110 is the delayed replica of the input electrical signal. Other electrical components are offset in frequency from this desired signal and are removed by a standard electrical bandpass filter 111. The output from the electrical bandpass filter 111 is then applied to terminal 112 which is the final output from the apparatus and which is a variable time delayed replica of the input signal.

To change the amount that the output signal is time delayed, the distance must be controlled between the acousto-optic transducer 105 and the point at which the optical beam is focused within the acousto-optic cell 106. As shown in the preferred embodiment of FIG. 1, this distance is controlled by moving the acousto-optic cell 106 relative to the focused input optical beam 102 by controlling a mechanical translation stage 103. To change the time delay of the output electrical signal, an adjustment is made to the mechanical adjuster 104 that sets the position of the mechanical translation stage 103. By making the mechanical adjuster 104 continuously variable, the time delay of the output signal is made continuously variable.

Figure 3:
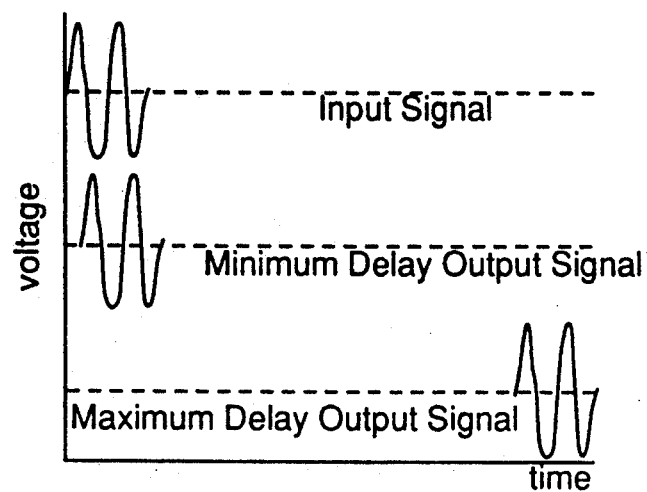
FIG. 3 is a graphical illustration of the input signal voltage to the apparatus of FIG. 1 and the output signal voltage from the apparatus for minimum and maximum delays.

The delay achieved by this apparatus is equal to the acoustic travel time between the acoustic transducer 105 and the center of the focused optical beam 102. Relating the time delay to physical distances shows that the time delay is given by $$\tau_d = x_f / V_a, \quad (2)$$

where $x_f$ is the distance between the transducer 105 and the center of the focused input beam 102 and $V_a$ is the acoustic velocity of the acousto-optic cell 106. By changing the distance $x_f$ with the mechanical adjustment 104, a change in the output time delay is effected. FIG. 3 illustrates an input electrical signal delayed at the minimum and maximum delays of the apparatus. By changing the manual adjustment 104, a continuum of time delays is effected between these extremes.

Figure 4:
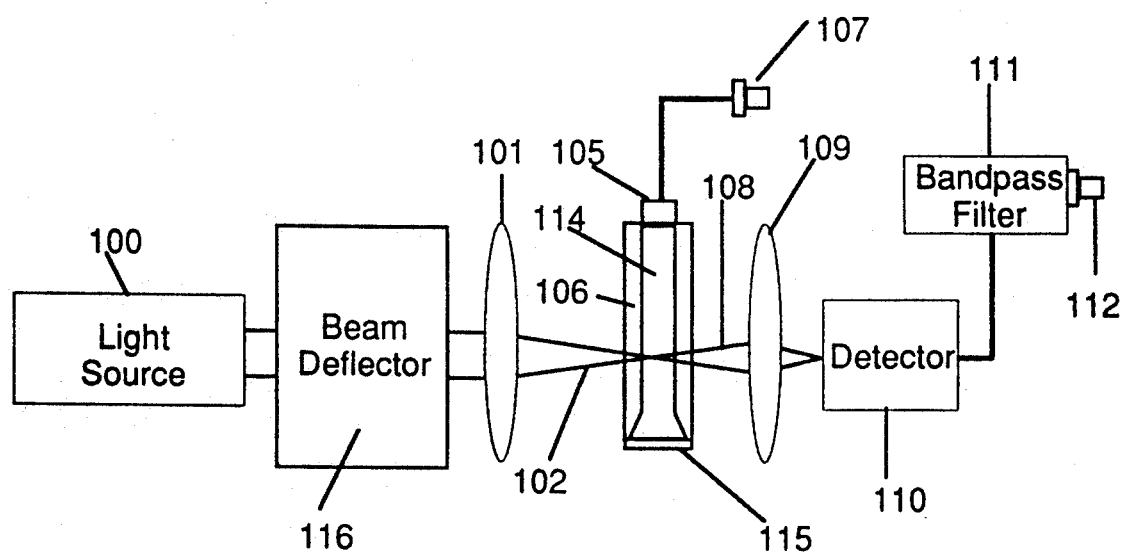
FIG. 4 is a diagrammatic illustration of a second embodiment of the improved continuously variable delay line employing the principles of our invention and includes a beam deflector for changing the time delay that the apparatus induces.

FIG. 4 shows another embodiment of the invention. By moving the focused input beam 102 instead of the acousto-optic cell 106, an equivalent time delay can be generated. This beam movement can be effected by using a beam deflector device 116 that deflects incident light beams, such as another acousto-optic cell or a mirror that can be either electrically or mechanically changed. Depending on exact beam scanning requirements for other applications, other optical elements may be required prior to and after the acousto-optic cell 106. For this embodiment, the principle of focusing the input beam to create a delayed output signal remains the same.

Acousto-optic devices come in two basic forms: bulk acoustic wave and surface acoustic wave, either of which are represented schematically in the figures as element 106. The bulk acoustic wave device, modulates the incident optical beam by launching an acoustic wave into the volume of a crystal. The surface acoustic wave device performs similarly except that both the acoustic wave and incident optical beam are confined to a planar region, such as an electronic wafer. This allows smaller acousto-optic systems to be constructed. Either device can be used in the disclosed continuously variable delay line.

It is also possible to implement the components of the invention in an optical waveguide. Such an optical waveguide could contain a laser light source, a focusing lens, a surface acoustic-wave acousto-optic device, and a detector. This would enable the delay line to be a very small and very stable package.

While we have described what is considered to be the preferred embodiments of this invention, it will be obvious to those skilled in the art that various changes and modifications may be made therein without departing from the spirit and scope of the invention as previously described and described in the claims.

What we claim is:

1. A delay line for generating a time delayed signal comprising:

means for providing a radiation source;

radiation focusing means responsive to said means for providing a radiation source to produce a focused radiation beam;

radiation modulation means, positioned to receive said focused radiation beam, responsive to a signal input to said radiation modulation means, for transferring the signal modulation of said input signal into temporal radiation modulation on a diffracted portion of said focused radiation beam which exits from said radiation modulation means, and for transmitting an undiffracted portion of said radiation beam, wherein said diffracted portion exits said modulation means overlapped by said undiffracted portion and wherein said diffracted portion is collinear with respective said undiffracted portions of said radiation beam;

means for detecting both said diffracted radiation beam and said undiffracted radiation beam exiting said radiation modulation means, and for generating an output signal; and filtering means for isolating unwanted signals from the output signal to produce a time delayed replication of said input signal.

2. The apparatus of claim 1, which further comprises a means for imparting relative motion between said focused radiation beam and said radiation modulation means continuously to vary the delay time of said input signal.

3. The apparatus of claim 1, wherein the cone angle of said focused radiation beam is at least as large as twice the Bragg angle.

4. The apparatus of claim 1, wherein the radiation means is a light source.

5. The apparatus of claim 1, wherein said radiation modulation means is an acousto-optic cell.

6. A delay line for generating a time delayed signal comprising:

means for providing a light source;

light focusing means responsive to said means for providing a light source to produce a focused light beam;

light modulation means, positioned to receive said focused light beam, responsive to a signal input to said light modulation means, for transferring the signal modulation of said input signal into temporal optical modulation on a diffracted portion of said light beam which exits from said light modulation said means, and for transmitting an undiffracted portion of light beam, wherein said diffracted portion exits said modulation means overlapped by said undiffracted portion and wherein said diffracted portion is collinear with respective said undiffracted portions of said light beam;

means for detecting both said diffracted light beam and said undiffracted light beam exiting said light modulation means and for generating an output signal; and filtering means for isolating unwanted signals from the output signal to produce a time delayed replication of said input signal.

7. The apparatus of claim 6, wherein the cone angle of said focused light beam is at least as large as twice the Bragg angle.

8. The apparatus of claim 6, which further comprises a means for imparting relative motion between said focused light beam and said light modulation means to continuously vary the delay time of said input signal.

9. The apparatus as set forth in claim 6 wherein said means for providing a light source is a coherent light source.

10. The apparatus as set forth in claim 6 wherein said means for providing a light source is an incoherent light source.

11. The apparatus as set forth in claim 6 wherein said focusing means is a lens.

12. The apparatus as set forth in claim 6 wherein said light modulation means is an acousto-optic cell.

13. The apparatus as set forth in claim 12 wherein said acousto-optic cell is an optical surface acoustic wave device.

14. An apparatus as set forth in claim 12 wherein said acousto-optic cell is a bulk acoustic wave device.

15. The apparatus as set forth in claim 8 wherein said means for imparting a relative motion is a controllable mechanical translation stage.

16. The apparatus as set forth in claim 8 wherein said means for imparting a relative motion is a light beam deflector between said light source means and light modulation means, so that light emanating from said light source means may be deflected.

17. The apparatus as set forth in claim 6 wherein said detection means is a photomixing detector.

18. The apparatus as set forth in claim 6 wherein said means for detection of the undiffracted and diffracted optical beams from the optical modulation means includes a lens and a photomixing detector.

19. The apparatus as set forth in claim 16 wherein said light beam deflector comprises a second acousto-optical modulation means.

20. An apparatus as set forth in claim 16 wherein said optical light beam deflector comprises a controllable mirror.

* * * * *